(12) United States Patent
Guzman et al.

(10) Patent No.: US 10,387,561 B2
(45) Date of Patent: Aug. 20, 2019

(54) SYSTEM AND METHOD FOR OBTAINING REISSUES OF ELECTRONIC DOCUMENTS LACKING REQUIRED DATA

(71) Applicant: Vatbox, Ltd., Herzeliya (IL)

(72) Inventors: Noam Guzman, Ramat Hasharon (IL); Isaac Saft, Kfar Neter (IL)

(73) Assignee: Vatbox, Ltd., Herzeliya (IL)

( * ) Notice: Subject to any disclaimer, the term of this patent is extended or adjusted under 35 U.S.C. 154(b) by 41 days.

(21) Appl. No.: 15/669,253

(22) Filed: Aug. 4, 2017

(65) Prior Publication Data
US 2018/0024984 A1  Jan. 25, 2018

Related U.S. Application Data

(63) Continuation-in-part of application No. 15/361,934, filed on Nov. 28, 2016.
(Continued)

(51) Int. Cl.
*G06Q 40/00* (2012.01)
*G06F 17/24* (2006.01)
(Continued)

(52) U.S. Cl.
CPC ........ *G06F 17/248* (2013.01); *G06F 16/5846* (2019.01); *G06F 16/903* (2019.01);
(Continued)

(58) Field of Classification Search
CPC .................................................... G06Q 40/00
See application file for complete search history.

(56) References Cited

U.S. PATENT DOCUMENTS 5,606,609 A   2/1997  Houser et al.
6,028,970 A   2/2000  DiPiazza et al.
(Continued)

FOREIGN PATENT DOCUMENTS

EP       456491 A2      11/1991
JP    2009157592 A       7/2009
(Continued)

OTHER PUBLICATIONS

Simon Slangen, 3 Ways to Electronically Sign Documents, Jun. 10, 2013, MUD, web, 1-8 (Year: 2013).*
(Continued)

*Primary Examiner* — I Jung Liu
(74) *Attorney, Agent, or Firm* — M&B IP Analysts, LLC

(57) ABSTRACT

A system and method for obtaining a reissue of an electronic document lacking required data. The method includes creating a template for the electronic document, wherein the template is a structured dataset including at least one transaction parameter determined based on the at least partially unstructured data; querying at least one data source for at least one requirement based on the template; determining, based on the template and the at least one requirement, whether the electronic document lacks at least a portion of the required data; retrieving completion data when it is determined that the electronic document lacks at least a portion of the required data; generating a reissue request electronic document including the electronic document and indicates a request to reissue the electronic document with respect to the completion data; and sending the reissue request electronic document to a reissuer server.

13 Claims, 4 Drawing Sheets

Related U.S. Application Data

(60) Provisional application No. 62/371,237, filed on Aug. 5, 2016, provisional application No. 62/260,553, filed on Nov. 29, 2015, provisional application No. 62/261,355, filed on Dec. 1, 2015.

(51) Int. Cl.
  *G06K 9/00* (2006.01)
  *G06F 16/93* (2019.01)
  *G06F 16/903* (2019.01)
  *G06F 16/583* (2019.01)
  *G06Q 10/10* (2012.01)

(52) U.S. Cl.
  CPC ......... *G06F 16/93* (2019.01); *G06K 9/00449* (2013.01); *G06K 9/00469* (2013.01); *G06K 9/00483* (2013.01); *G06Q 40/00* (2013.01); *G06Q 40/123* (2013.12); *G06K 2209/01* (2013.01); *G06Q 10/10* (2013.01)

(56) References Cited

U.S. PATENT DOCUMENTS

| | | |
|---|---|---|
| 6,343,149 B1 | 1/2002 | Motoiwa |
| 6,546,373 B1 | 4/2003 | Cerra |
| 7,299,408 B1 | 11/2007 | Daconta et al. |
| 7,693,760 B1 | 4/2010 | Fiteni et al. |
| 7,827,079 B2 | 11/2010 | Feldman et al. |
| 8,046,288 B1 | 10/2011 | LeRoux et al. |
| 8,065,611 B1 | 11/2011 | Chan et al. |
| 8,200,642 B2 | 6/2012 | Maze |
| 8,228,299 B1 | 7/2012 | Maloney et al. |
| 8,386,394 B1 | 2/2013 | Nguyen et al. |
| 8,417,017 B1 | 4/2013 | Beutel et al. |
| 8,438,089 B1 | 5/2013 | Wasserblat et al. |
| 8,447,111 B2 | 5/2013 | King et al. |
| 8,639,062 B2 | 1/2014 | Calman et al. |
| 8,798,354 B1 | 8/2014 | Bunzel et al. |
| 8,890,978 B1 | 11/2014 | Madhani et al. |
| 8,996,350 B1 | 3/2015 | Dub et al. |
| 9,141,607 B1 | 9/2015 | Lee et al. |
| 9,158,833 B2 | 10/2015 | Urbschat et al. |
| 9,824,270 B1 | 11/2017 | Mao |
| 2001/0049680 A1 | 12/2001 | Yanagimoto |
| 2002/0091671 A1 | 7/2002 | Prokoph |
| 2002/0138467 A1 | 9/2002 | Jacobson et al. |
| 2003/0088562 A1 | 5/2003 | Dillon et al. |
| 2003/0163778 A1 | 8/2003 | Shores et al. |
| 2003/0212617 A1 | 11/2003 | Stone et al. |
| 2004/0010451 A1 | 1/2004 | Romano et al. |
| 2004/0034554 A1 | 2/2004 | Shirley et al. |
| 2004/0181749 A1 | 9/2004 | Chellapilla et al. |
| 2004/0267620 A1 | 12/2004 | Feldman et al. |
| 2005/0165623 A1 | 7/2005 | Landi et al. |
| 2005/0273614 A1 | 12/2005 | Ahuja et al. |
| 2006/0004814 A1 | 1/2006 | Lawrence et al. |
| 2006/0219773 A1 | 10/2006 | Richardson |
| 2007/0050356 A1 | 3/2007 | Amadio |
| 2007/0168382 A1 | 7/2007 | Tillberg et al. |
| 2007/0237427 A1 | 10/2007 | Patel et al. |
| 2007/0250416 A1 | 10/2007 | Beach et al. |
| 2008/0082374 A1 | 4/2008 | Kennis et al. |
| 2008/0126155 A1 | 5/2008 | Xu et al. |
| 2008/0183523 A1 | 7/2008 | Dikeman |
| 2008/0219543 A1 | 9/2008 | Csulits et al. |
| 2008/0229187 A1 | 9/2008 | Mahoney et al. |
| 2009/0063470 A1 | 3/2009 | Peled et al. |
| 2009/0112743 A1 | 4/2009 | Mullins et al. |
| 2009/0192978 A1 | 7/2009 | Hewett et al. |
| 2009/0228294 A1* | 9/2009 | Choi ............ G06Q 40/00 705/35 |
| 2010/0070562 A1 | 3/2010 | Boyer et al. |
| 2010/0106544 A1 | 4/2010 | Frost et al. |
| 2010/0161616 A1 | 6/2010 | Mitchell |
| 2010/0182631 A1 | 7/2010 | King et al. |
| 2010/0211609 A1 | 8/2010 | Xiong et al. |
| 2010/0220929 A1 | 9/2010 | Misawa et al. |
| 2011/0016043 A1 | 1/2011 | Dornseif |
| 2011/0138175 A1 | 6/2011 | Clark et al. |
| 2011/0182500 A1 | 7/2011 | Esposito et al. |
| 2011/0255784 A1 | 10/2011 | Welling et al. |
| 2012/0027246 A1 | 2/2012 | Tifford et al. |
| 2012/0078768 A1 | 3/2012 | King et al. |
| 2012/0133989 A1 | 5/2012 | Glover |
| 2012/0221448 A1 | 8/2012 | Evans et al. |
| 2013/0051671 A1 | 2/2013 | Barton |
| 2013/0179314 A1 | 7/2013 | Stoke et al. |
| 2013/0282725 A1 | 10/2013 | Rubinger |
| 2013/0291127 A1 | 10/2013 | Bergman et al. |
| 2014/0006234 A1 | 1/2014 | Geisau et al. |
| 2014/0067633 A1 | 3/2014 | Venkatasubramanian et al. |
| 2014/0079294 A1 | 3/2014 | Amtrup et al. |
| 2014/0129400 A1 | 5/2014 | Armstrong et al. |
| 2014/0153830 A1 | 6/2014 | Amtrup et al. |
| 2014/0207634 A1 | 7/2014 | Edmonds |
| 2014/0244458 A1 | 8/2014 | Saft et al. |
| 2014/0344576 A1 | 11/2014 | Johnson |
| 2015/0012339 A1 | 1/2015 | Onischuk |
| 2015/0019409 A1 | 1/2015 | Vagiri |
| 2015/0019586 A1 | 1/2015 | Raichelgauz et al. |
| 2015/0026556 A1 | 1/2015 | Stadermann et al. |
| 2015/0106247 A1 | 4/2015 | Saft et al. |
| 2015/0127534 A1 | 5/2015 | Bhambhani |
| 2015/0235301 A1 | 8/2015 | Brady et al. |
| 2015/0242832 A1 | 8/2015 | Corritori et al. |
| 2015/0248657 A1 | 9/2015 | Loock et al. |
| 2015/0302154 A1 | 10/2015 | Brooks |
| 2015/0324767 A1 | 11/2015 | Walsh et al. |
| 2015/0332283 A1 | 11/2015 | Witchey |
| 2015/0356174 A1 | 12/2015 | Narayana et al. |
| 2015/0356545 A1 | 12/2015 | Marcuccilli et al. |
| 2015/0363893 A1 | 12/2015 | Saft et al. |
| 2015/0379346 A1 | 12/2015 | Newcomer et al. |
| 2016/0042471 A1 | 2/2016 | Barrett et al. |
| 2017/0147540 A1 | 5/2017 | McCormick et al. |
| 2017/0351968 A1 | 12/2017 | Bowers et al. |
| 2018/0012268 A1 | 1/2018 | Simantov et al. |

FOREIGN PATENT DOCUMENTS

| | | |
|---|---|---|
| JP | 2013016097 A | 1/2013 |
| WO | 2010143001 A1 | 12/2010 |
| WO | 2013048790 A1 | 4/2013 |
| WO | 2014132256 A1 | 9/2014 |
| WO | 2016115207 A1 | 7/2016 |

OTHER PUBLICATIONS

A Non-Final Office Action for U.S. Appl. No. 15/013,284 cited by the USPTO dated Apr. 4, 2017.

The International Search Report and the Written Opinion for PCT/US2016/016104, ISA/RU, Moscow, Russia, dated Apr. 14, 2016.

The International Search Report and the Written Opinion for PCT/US2016/063828, ISA/RU, Moscow, Russia, dated Apr. 13, 2017.

The International Search Report and the Written Opinion for PCT/US2016/066845, ISA/RU, Moscow, Russia, dated May 25, 2017.

The International Search Report and the Written Opinion for PCT/US2016/068536, ISA/RU, Moscow, Russia, dated Apr. 13, 2017.

The International Search Report and the Written Opinion for PCT/US2016/068714, ISA/RU, Moscow, Russia, dated May 11, 2017.

The International Search Report and the Written Opinion for PCT/US2017/012120, ISA/RU, Moscow, Russia, dated May 18, 2017.

The International Search Report and the Written Opinion for PCT/US2017/014874, ISA/RU, Moscow, Russia, dated May 18, 2017.

(56) References Cited

OTHER PUBLICATIONS

The International Search Report and the Written Opinion for PCT/US2017/015087, ISA/RU, Moscow, Russia, dated Jan. 26, 2017.
The International Search Report and The Written Opinion for PCT/US2017/045488, ISA/RU, Moscow, RU, dated Jan. 11, 2018.
The International Search Report and The Written Opinion for PCT/US2017/055135, ISA/RU, Moscow, RU, dated Jan. 25, 2018.
The International Search Report and the Written Opinion of PCT/US2017/045333, ISA/RU, Moscow, Russia, dated Dec. 28, 2017.
The International Search Report and the Written Opinion of PCT/US2017/045497, ISA/RU, Moscow, Russia, dated Dec. 14, 2017.
The International Search Report and the Written Opinion of the International Searching Authority for PCT/US2016/067716, ISA/RU, Moscow, Russia, dated Jul. 20, 2017.
The International Search Report and the Written Opinion of the International Searching Authority for PCT/US2017/032854, ISA/RU, Moscow, Russia, dated Oct. 12, 2017.
The International Search Report and the Written Opinion of the International Searching Authority for PCT/US2017/032855, ISA/RU, Moscow, Russia, dated Oct. 19, 2017.
The International Search Report and the Written Opinion of the International Searching Authority for PCT/US2017/033106, ISA/RU, Moscow, Russia, dated Oct. 12, 2017.
The International Search Report and the Written Opinion of the International Searching Authority for PCT/US2017/033338, ISA/RU, Moscow, Russia, dated Oct. 26, 2017.
The International Search Report and The Written Opinion of The International Searching Authority for PCT/US2017/043644, ISA/RU, Moscow, Russia, dated Dec. 28, 2017.
The International Search Report and The Written Opinion of The International Searching Authority for PCT/US2017/045338, ISA/RU, Moscow, Russia, dated Dec. 28, 2017.
The International Search Report and The Written Opinion of The International Searching Authority for PCT/US2017/045342, ISA/RU, Moscow, Russia, dated Dec. 28, 2017.
The International Search Report and The Written Opinion of The International Searching Authority for PCT/US2017/045491, ISA/RU, Moscow, Russia, dated Dec. 28, 2017.
The International Search Report and The Written Opinion of The International Searching Authority for PCT/US2017/045554, ISA/RU, Moscow, Russia, dated Dec. 28, 2017.
The International Search Report and The Written Opinion of The International Searching Authority for PCT/US2017/046317, ISA/RU, Moscow, Russia, dated Dec. 28, 2017.
The International Search Report and The Written Opinion of The International Searching Authority for PCT/US2017/056448, ISA/RU, Moscow, Russia, dated Jan. 25, 2018.
The European Search Report for 16869348.9 dated Apr. 2, 2019, EPO, Munich, Germany.
The International Search Report and the Written Opinion for PCT/US2017/064191, dated Feb. 28, 2018, ISA/RU, Moscow, Russia.
The European Search Report for European Application No. 16890887.9, dated Jun. 5, 2019, EPO, Munich, Germany.

* cited by examiner

SYSTEM AND METHOD FOR OBTAINING REISSUES OF ELECTRONIC DOCUMENTS LACKING REQUIRED DATA

CROSS-REFERENCE TO RELATED APPLICATIONS

This application claims the benefit of U.S. Provisional Application No. 62/371,237 filed on Aug. 5, 2016. This application is also a continuation-in-part of U.S. patent application Ser. No. 15/361,934 filed on Nov. 28, 2016, now pending, which claims the benefit of U.S. Provisional Application No. 62/260,553 filed on Nov. 29, 2015, and of U.S. Provisional Application No. 62/261,355 filed on Dec. 1, 2015. The contents of the above-referenced applications are hereby incorporated by reference.

TECHNICAL FIELD

The disclosure generally relates to a system for monitoring expenses included in electronic documents, and more specifically to automatically reissuing expense evidence electronic documents lacking required data.

BACKGROUND

As businesses increasingly rely on technology to manage data related to operations such as invoice and purchase order data, suitable systems for properly managing and validating data have become crucial to success. Particularly for large businesses, the amount of data utilized daily by businesses can be overwhelming. Accordingly, manual review and validation of such data is impractical, at best. However, disparities between recordkeeping documents can cause significant problems for businesses such as, for example, failure to properly report earnings to tax authorities.

Some solutions exist for automatically recognizing information in scanned documents (e.g., invoices and receipts) or other unstructured electronic documents (e.g., unstructured text files). Such solutions often face challenges in accurately identifying and recognizing characters and other features of electronic documents. Moreover, degradation in content of the input unstructured electronic documents typically result in higher error rates. As a result, existing image recognition techniques are not completely accurate under ideal circumstances (i.e., very clear images), and their accuracy often decreases dramatically when input images are less clear. Moreover, missing or otherwise incomplete data can result in errors during subsequent use of the data. Many existing solutions cannot identify missing data unless, e.g., a field in a structured dataset is left incomplete.

In addition, existing image recognition solutions may be unable to accurately identify some or all special characters (e.g., "!," "@," "#," "$," "©," "%," "&," etc.). As an example, some existing image recognition solutions may inaccurately identify a dash included in a scanned receipt as the number "1." As another example, some existing image recognition solutions cannot identify special characters such as the dollar sign, the yen symbol, etc.

Further, such solutions may face challenges in preparing recognized information for subsequent use. Specifically, many such solutions either produce output in an unstructured format, or can only produce structured output if the input electronic documents are specifically formatted for recognition by an image recognition system. The resulting unstructured output typically cannot be processed efficiently. In particular, such unstructured output may contain duplicates, and may include data that requires subsequent processing prior to use.

Enterprises all over the world usually spend large amounts of money on business services and goods purchased by employees in the course of employment. In most cases these transactions may be refundable as the enterprise can reclaim the value added tax (VAT) as well as deducting qualified expenses from the corporate income tax (CIT). Such expenses should be reported to appropriate tax authorities in order to reclaim at least a partial tax refund for the expenses made.

In many cases, depending on the regulation in the particular jurisdiction, enterprises are required to provide expense evidences, such as for example, receipts, invoices, and the like, associated with the expenses made, as well as a statement indicating the type and amount of expense. The expense report together with the respective evidences is provided to the tax authorities in order to reclaim the VAT and/or to deduct the CIT associated with the transaction.

In case an evidence does not include one or more of the necessary elements, such as for example, supplier name, supplier address, supplier ID, date, amount, etc., the enterprise may not be able to use this evidence for VAT reclaiming and/or CIT deducting. In order to deal with this issue and get the full VAT reclaim and/or CIT deduction, enterprises need to devote significant time and resources. One popular, however expensive, solution is to hire the services of an accounting firm to handle this important financial matter.

Although some existing solutions provide techniques by which enterprises collect and analyze data associated with expenses made by their employees, the usage made with this data is still limited. In particular, such solutions may face challenges in efficiently and accurately identifying documents lacking required data. Further, such solutions do not automatically reissue documents identified as lacking the required data.

It would be therefore advantageous to provide a solution that overcomes the limitations of the prior art by providing an efficient method for reissuing expense evidences.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for obtaining a reissue of an electronic document lacking required data, the electronic document including at least partially unstructured data. The method comprises: creating a template for the electronic document, wherein the template is a structured dataset including at least one transaction parameter determined based on the at least partially unstructured data; querying at least one data source for at least one requirement based on the template, wherein the at least one requirement defines required data for the electronic document; determining, based on the template and the at least one requirement, whether the electronic document lacks at least a portion of the required data; retrieving completion data when it is determined that the electronic document lacks at least a portion of the required data, wherein the completion data completes the required data; generating a reissue request electronic document, wherein the reissue request electronic document includes the electronic document and indicates a request to reissue the electronic document with respect to the completion data; and sending the reissue request electronic document to a reissuer server.

Certain embodiments disclosed herein also include a non-transitory computer readable medium having stored thereon instructions for causing a processing circuitry to perform a process for obtaining a reissue of an electronic document lacking required data, the electronic document including at least partially unstructured data, the process comprising: creating a template for the electronic document, wherein the template is a structured dataset including at least one transaction parameter determined based on the at least partially unstructured data; querying at least one data source for at least one requirement based on the template, wherein the at least one requirement defines required data for the electronic document; determining, based on the template and the at least one requirement, whether the electronic document lacks at least a portion of the required data; retrieving completion data when it is determined that the electronic document lacks at least a portion of the required data, wherein the completion data completes the required data; generating a reissue request electronic document, wherein the reissue request electronic document includes the electronic document and indicates a request to reissue the electronic document with respect to the completion data; and sending the reissue request electronic document to a reissuer server.

Certain embodiments disclosed herein also include a system for obtaining a reissue of an electronic document lacking required data, the electronic document including at least partially unstructured data. The system comprises: a processing circuitry; and a memory, the memory containing instructions that, when executed by the processing circuitry, configure the system to: create a template for the electronic document, wherein the template is a structured dataset including at least one transaction parameter determined based on the at least partially unstructured data; query at least one data source for at least one requirement based on the template, wherein the at least one requirement defines required data for the electronic document; determine, based on the template and the at least one requirement, whether the electronic document lacks at least a portion of the required data; retrieve completion data when it is determined that the electronic document lacks at least a portion of the required data, wherein the completion data completes the required data; generate a reissue request electronic document, wherein the reissue request electronic document includes the electronic document and indicates a request to reissue the electronic document with respect to the completion data; and send the reissue request electronic document to a reissuer server.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
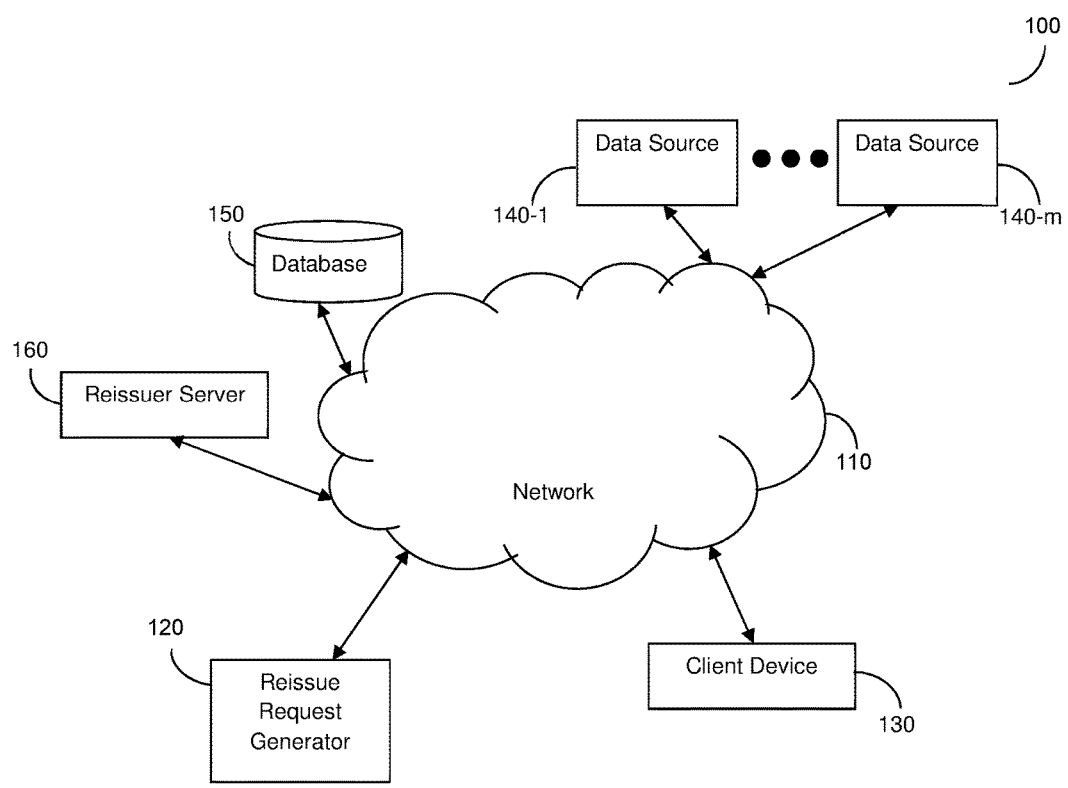
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for reissuing electronic documents lacking required data. In an embodiment, a dataset is created based on an electronic document indicating information related to a transaction. A template of transaction attributes is created based on the electronic document dataset. Based on the template created for the electronic document, electronic document requirements are retrieved. Based on the template and the electronic document requirements, it is determined whether the electronic document does not include required data and, if so, a reissue request electronic document is generated. The reissue request electronic document may include an application form, the electronic document, and an indication of the required data. The reissue request electronic document may further include the required data extracted from a database.

The disclosed embodiments allow for automatically identifying electronic documents lacking required data and obtaining reissued versions of those electronic documents. More specifically, the disclosed embodiments include providing structured dataset templates for electronic documents, thereby allowing for retrieving evidencing documents based on electronic evidences that are unstructured, semi-structured, or otherwise lacking a known structure. For example, the disclosed embodiments may be used to effectively analyze images of scanned receipts for transactions, thereby allowing for more accurate recognition of specific portions of the evidences lacking requiring data.

FIG. 1 shows an example network diagram 100 utilized to describe the various disclosed embodiments. The network diagram 100 includes a reissue request generator 120, a client device 130, a plurality of data sources 140-1 through 140-*m* (hereinafter referred to as a data source 140 and collectively as data sources 140, merely for simplicity purposes), a database 150, and a reissuer server 160, communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The client device 130 may be for example, a smart phone, a mobile phone, a laptop, a personal computer, a tablet computer, a wearable computing device, and the like. In an example implementation, the client device 130 is utilized by an employee of an enterprise and is configured to send, to the reissue request generator 120, an electronic document that may need to be reissued.

Each of the data sources 140 stores data related to requirements for electronic documents. The data may include, but is not limited to, rules defining the requirements. In an example implementation, the requirements include regulatory tax requirements indicated information needed for reclaiming or deducting based on transactions of evidencing electronic documents such as receipts or invoices. The regulatory tax requirements are rules and regulations legislated by legislators of different jurisdictions and, therefore, typically vary from one jurisdiction to another.

The database 150 is a data repository containing data that may be utilized to reissue a complete version of an electronic document that does not meet the requirements. Such data may include, for example, companies' names, companies' addresses, companies' VAT ID numbers, and the like. When an electronic document lacks required data, the required data may be obtained from the database 150 and included in a request for reissue, thereby providing the reissuer with the required information.

The reissuer server 160 may be configured to receive reissue request electronic documents including application forms, requests for reissue, required data to be included in the reissued electronic document, and the like. In an example implementation, the reissuer server 160 may be a server of a merchant or other seller who created the original electronic document such that the reissued electronic document.

In an embodiment, the reissue request generator 120 is configured to receive, from the client device 130, an electronic document. The electronic document may be an evidencing electronic document such as, but not limited to, an electronic invoice, an electronic receipt, and the like. For example, the electronic document may be an image showing a scanned copy of a receipt issued by a supplier that provided a good or service to an employee of a company. In another implementation, the reissue request generator 120 may be configured to retrieve the electronic document from another source such as, but not limited to, an enterprise resource system (not shown), another data source, and the like.

In an embodiment, the reissue request generator 120 is configured to create a template based on transaction parameters identified using machine vision of the received electronic document. To this end, the reissue request generator 120 is configured to create datasets based on electronic documents including data at least partially lacking a known structure (e.g., unstructured data, semi-structured data, or structured data having an unknown structure). The reissue request generator 120 may be further configured to utilize optical character recognition (OCR) or other image processing to determine data in the electronic document. The reissue request generator 120 may therefore include or be communicatively connected to a recognition processor (e.g., the recognition processor 235, FIG. 2).

In an embodiment, the reissue request generator 120 is configured to analyze the created datasets to identify transaction parameters related to transactions indicated in the electronic documents. Each created template is a structured dataset including the identified transaction parameters for a transaction. The transaction parameters include at least a supplier identifier and may further include, but are not limited to, purchaser name, transaction total amount (e.g., price), VAT amount, date of transaction, location of transaction, and the like. The supplier identifier may be, for example, the supplier's name, a supplier ID number, a VAT ID, and the like.

Using structured templates for determining electronic documents requiring reissue allows for more efficient and accurate determination than, for example, by utilizing unstructured data. Specifically, requirement rules may be analyzed only with respect to relevant portions in a structured template of an electronic document (e.g., portions included in specific fields of the template), thereby reducing the number of instances of application of each rule as well as reducing false positives due to applying rules to data that is likely unrelated to each rule. Further, data extracted from electronic documents and organized into templates requires less memory than, for example, images of scanned documents.

In an embodiment, based on the template created for the received electronic document, the reissue request generator 120 is configured to query one or more of the data sources 140 for electronic document requirements. To this end, the query may be based on data in one or more predetermined fields of the created template. Specifically, the data sources 140 to which the query should be sent may be selected based on the data in the predetermined fields. For example, in case the plurality of data elements indicate that the supplier is a hotel based in France, the reissue request generator 120 may query a website associated with the European Union (EU) for the requirements.

The requirements include data that must be included in electronic documents in order to, e.g., obtain a refund or deduction of taxes. The requirements that may be different from one jurisdiction to another, and may include, but are not limited to, purchaser's name, supplier's name, transaction's total amount, combinations thereof, and the like. The requirements may be stored in the form of rules, where the rules may be applied to data in the created template to determine whether and which required data is not included in the electronic document.

In an embodiment, the reissue request generator 120 is configured to compare the plurality of data elements to the retrieved requirements. For example, the requirements may indicate that a purchaser ID must be included in an evidencing electronic document and, based on comparison to the template, it is determined that the purchaser ID is missing. In some implementations, the electronic document may be determined to be lacking required data when the required data is included in the electronic document but is unclear or otherwise unusable. For example, an invoice is partially deleted and some parts of the data elements that exist within the expense evidence, such as, letters, numbers, etc., are unclear.

In another embodiment, the reissue request generator 120 may be configured to retrieve an unstructured electronic document indicating the requirements. To this end, the reissue request generator 120 may be configured to perform OCR on the requirements electronic document to extract the requirements.

In an embodiment, when it is determined that at least a portion of the electronic document lacks required data, the reissue request generator 120 may be configured to extract, from the database 150, data to be utilized for completing the required data. For example, in case a purchaser address was identified as required data that the electronic document lacks, the reissue request generator 120 may extract the purchaser address from the database 150. According to another embodiment, the reissue request generator 120 may be configured to extract the data from other sources (not shown), such as for example, websites, data repositories, and the like. The completion data may be extracted based on one or more of the transaction parameters of the created template, for example, a transaction identifier may be utilized to identify data associated with the transaction indicated in the electronic document, and the appropriate completion data may be determined among the identified data.

In an embodiment, the reissue request generator 120 is configured to generate a reissue request electronic document. The reissue request electronic document may be or may include, but is not limited to, an application form, the completion data, or both. The application form may include the electronic document and a request to reissue an updated electronic document. In some implementations, the application form may include or indicate the completion data. For example, based on completion data for a required purchaser ID number for an invoice, the reissue request generator 120 generates an application form that includes the invoice and a request for reissuing a corresponding completed expense evidence.

In an embodiment, the reissue request generator 120 may be configured to send the reissue request electronic document to the reissuer server 160 and to receive, from the reissuer server 160, the reissued electronic document. In some implementations, the reissue request generator 160 may be configured to select the reissuer server 160 to which the reissue request electronic document should be sent from among multiple reissuer servers (not shown). The reissuer server 160 may be selected based on, for example, a merchant identifier indicated in the electronic document to be reissued (e.g., as indicated in a "merchant ID" field of the created template).

Figure 2:
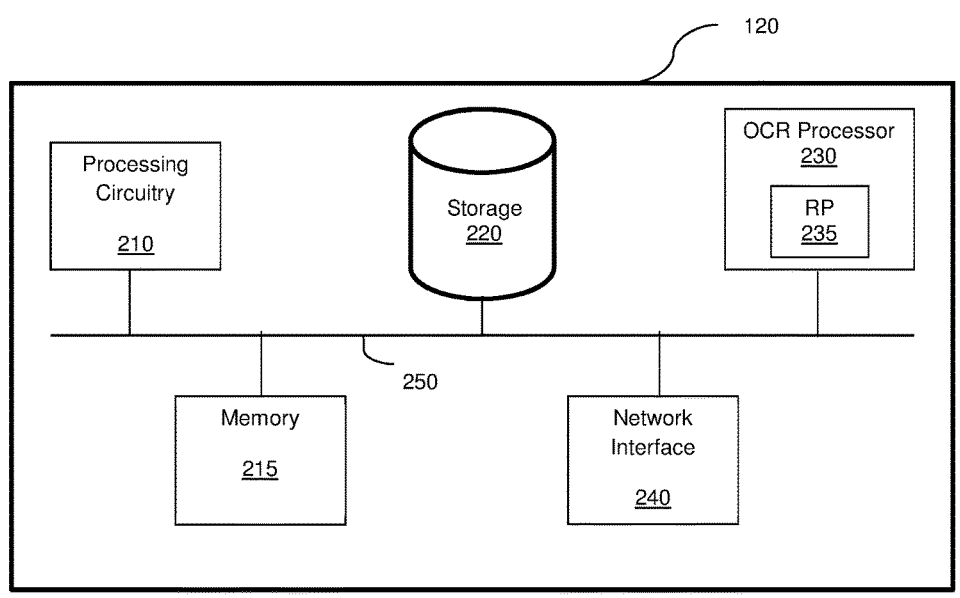
FIG. 2 is a schematic diagram of an electronic document reissuer according to an embodiment.

FIG. 2 is an example schematic diagram of the reissue request generator 120 according to an embodiment. The reissue request generator 120 includes a processing circuitry 210 coupled to a memory 215, a storage 220, and a network interface 240. In an embodiment, the reissue request generator 120 may include an optical character recognition (OCR) processor 230. In another embodiment, the components of the reissue request generator 120 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to request reissues of electronic documents lacking required data, as discussed herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The OCR processor 230 may include, but is not limited to, a feature and/or pattern recognition processor (RP) 235 configured to identify patterns, features, or both, in unstructured data sets. Specifically, in an embodiment, the OCR processor 230 is configured to identify at least characters in the unstructured data. The identified characters may be utilized to create a dataset including data required for verification of a request.

The network interface 240 allows the reissue request generator 120 to communicate with the enterprise system 130, the database 140, the web sources 150, or a combination of, for the purpose of, for example, collecting metadata, retrieving data, storing data, and the like.

It should be understood that the embodiments described herein are not limited to the specific architecture illustrated in FIG. 2, and other architectures may be equally used without departing from the scope of the disclosed embodiments.

Figure 3:
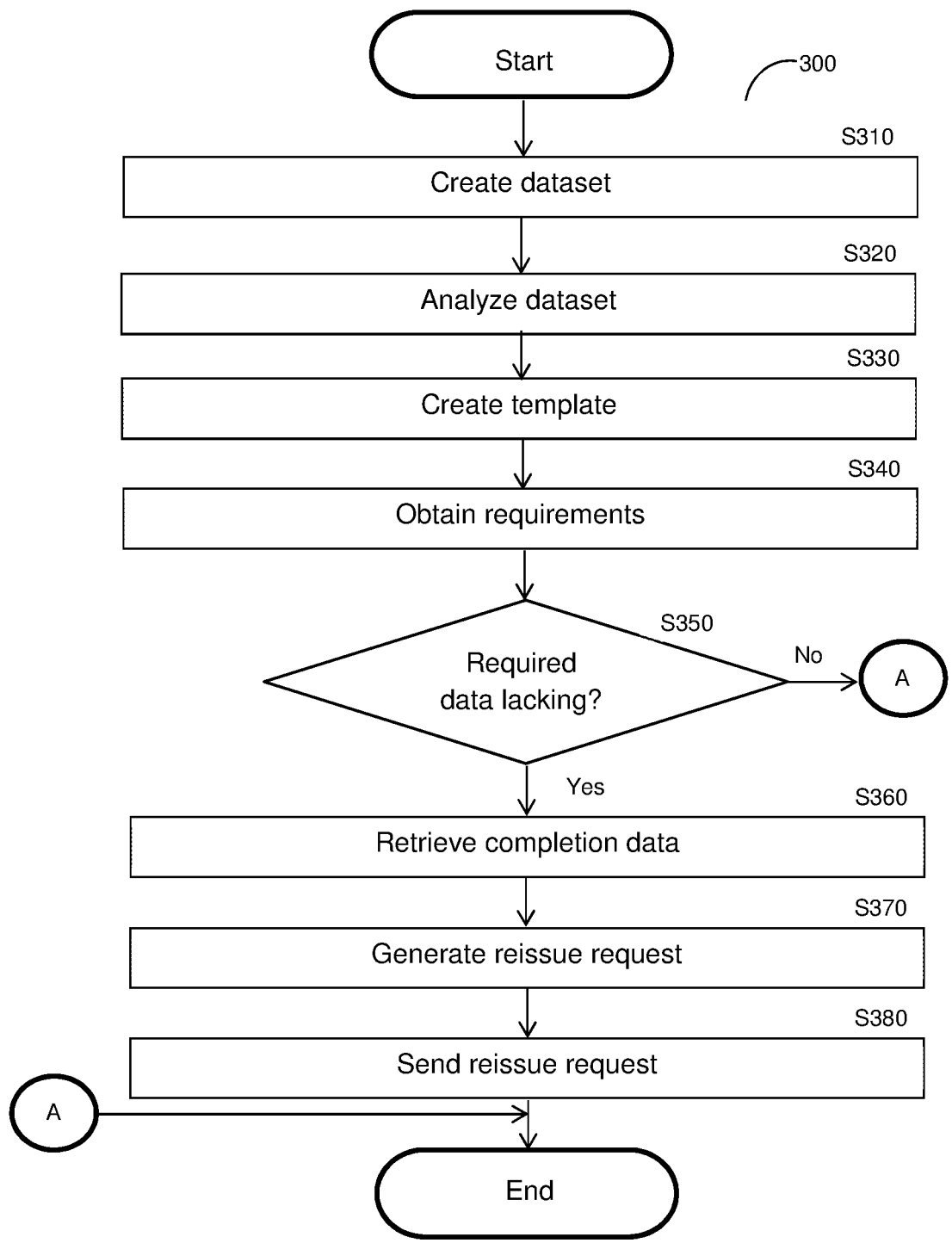
FIG. 3 is a flowchart illustrating a method for reissuing electronic documents according to an embodiment.

FIG. 3 is an example flowchart 300 illustrating a method for requesting reissue of an electronic document lacking required data according to an embodiment. In an embodiment, the method may be performed by the reissue request generator 120.

At S310, a dataset is created based on the electronic document including data related to a transaction. The electronic document may include, but is not limited to, unstructured data, semi-structured data, structured data with structure that is unanticipated or unannounced, or a combination thereof. In an embodiment, S310 may further include analyzing the electronic document using optical character recognition (OCR) to determine data in the electronic document, identifying key fields in the data, identifying values in the data, or a combination thereof. Creating datasets based on electronic documents is described further herein below with respect to FIG. 4.

The electronic document may be, for example, an image showing a scanned invoice. The electronic document may be received from a client device (e.g., a device utilized by an employee of an organization who submits an invoice as evidence of a transaction). Alternatively, the electronic document may be retrieved from a database or enterprise resource system.

At S320, the dataset is analyzed. In an embodiment, analyzing the dataset may include, but is not limited to, determining transaction parameters such as, but not limited to, at least one entity identifier (e.g., a consumer enterprise identifier, a merchant enterprise identifier, or both), information related to the transaction (e.g., a date, a time, a price, a type of good or service sold, etc.), or both. In a further embodiment, analyzing the dataset may also include identifying the transaction based on the dataset. In an example implementation, the transaction parameters include at least a supplier identifier.

At S330, a template is created based on the dataset. The template may be, but is not limited to, a data structure including a plurality of fields. The fields may include the identified transaction parameters. The fields may be predefined.

Creating templates from electronic documents allows for faster processing due to the structured nature of the created templates. For example, query and manipulation operations may be performed more efficiently on structured datasets than on datasets lacking such structure. Further, organizing information from electronic documents into structured datasets, the amount of storage required for saving information contained in electronic documents may be significantly reduced. Electronic documents are often images that require more storage space than datasets containing the same information. For example, datasets representing data from 100,000 image electronic documents can be saved as data records in a text file. A size of such a text file would be significantly less than the size of the 100,000 images.

At S340, the reissue request generator 120 queries one or more data sources to obtain electronic document requirements based on the created template. In an embodiment, the query may be based on data in one or more predetermined fields of the created template. The requirements may be, for example, tax reporting requirements, and may be retrieved as one or more requirement rules defining required data (e.g., with respect to predetermined fields of the template).

At S350, based on the template and the obtained requirements, it is determined whether the electronic document lacks required data and, if so, execution continues with S360; otherwise, execution terminates. In an embodiment, S350 may include applying requirement rules to data of the created template. The electronic document may be determined to lack the required data when, for example, the required data is missing, incomplete, unclear, or otherwise unusable.

At S360, when it is determined that the electronic document lacks required data, completion data for providing the lacking required data may be retrieved. The completion data may be retrieved based on the lacking required data and one or more of the transaction parameters that uniquely identify the transaction of the electronic document such as a transaction identifier or a combination of time and buyer.

At S370, a reissue request electronic document is generated. In an embodiment, the reissue request electronic document is or includes an electronic application form generated based on the transaction parameters, the required data, the completion data, or a combination thereof. The electronic application form may further include the electronic document lacking the required data. The electronic application form may indicate the required data and the completion data to be utilized for creating a reissue electronic document, and may further indicate a request for the reissue electronic document.

At S380, the generated reissue request electronic document may be sent to a reissuer server such as, for example, a server of a supplier or merchant involved in the transaction of the electronic document to be reissued.

Figure 4:
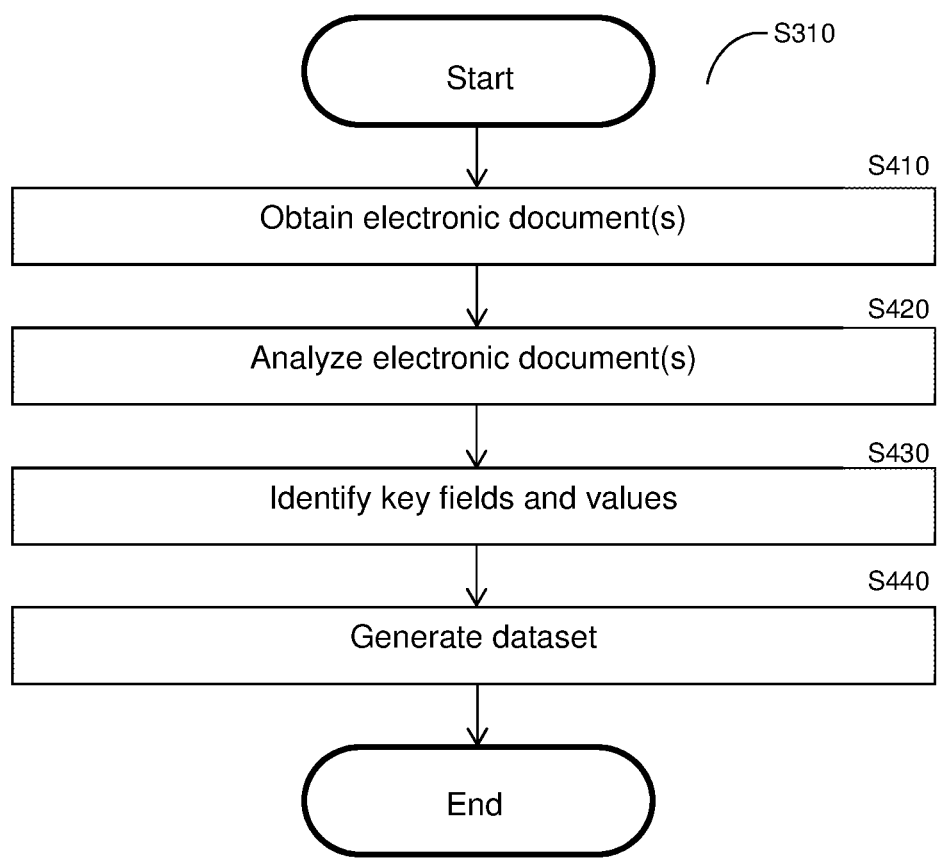
FIG. 4 is a flowchart illustrating a method for creating a dataset based on at least one electronic document according to an embodiment.

FIG. 4 is an example flowchart S310 illustrating a method for creating a dataset based on an electronic document according to an embodiment.

At S410, the electronic document is obtained. Obtaining the electronic document may include, but is not limited to, receiving the electronic document (e.g., receiving a scanned image) or retrieving the electronic document (e.g., retrieving the electronic document from a consumer enterprise system, a merchant enterprise system, or a database).

At S420, the electronic document is analyzed. The analysis may include, but is not limited to, using optical character recognition (OCR) to determine characters in the electronic document.

At S430, based on the analysis, key fields and values in the electronic document are identified. The key field may include, but are not limited to, merchant's name and address, date, currency, good or service sold, a transaction identifier, an invoice number, and so on. An electronic document may include unnecessary details that would not be considered to be key values. As an example, a logo of the merchant may not be required and, thus, is not a key value. In an embodiment, a list of key fields may be predefined, and pieces of data that may match the key fields are extracted. Then, a cleaning process is performed to ensure that the information is accurately presented. For example, if the OCR would result in a data presented as "1211212005", the cleaning process will convert this data to 12/12/2005. As another example, if a name is presented as "Mo$den", this will change to "Mosden". The cleaning process may be performed using external information resources, such as dictionaries, calendars, and the like.

In a further embodiment, it is checked if the extracted pieces of data are completed. For example, if the merchant name can be identified but its address is missing, then the key field for the merchant address is incomplete. An attempt to complete the missing key field values is performed. This attempt may include querying external systems and databases, correlation with previously analyzed invoices, or a combination thereof. Examples for external systems and databases may include business directories, Universal Product Code (UPC) databases, parcel delivery and tracking systems, and so on. In an embodiment, S430 results in a complete set of the predefined key fields and their respective values.

At S440, a structured dataset is generated. The generated dataset includes the identified key fields and values.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for obtaining a reissue of an electronic document lacking required data, the electronic document including at least partially unstructured data, comprising:
   identifying, in the electronic document, at least one key field and at least one value, wherein
   identifying the at least one key field and the at least one value further comprises:
      analyzing the electronic document to determine data in the electronic document; and
      extracting, based on a predetermined list of key fields, at least a portion of the determined data, wherein the at least a portion of the determined data matches at least one key field of the predetermined list of key fields;
   creating a template for the electronic document, wherein the template is a structured dataset including at least one transaction parameter determined based on the at least partially unstructured data;
   querying at least one data source for at least one requirement based on the template, wherein the at least one requirement defines required data for the electronic document;
   determining, based on the template and the at least one requirement, whether the electronic document lacks at least a portion of the required data;
   retrieving completion data when it is determined that the electronic document lacks at least a portion of the required data, wherein the completion data completes the required data;
   generating a reissue request electronic document, wherein the reissue request electronic document includes the electronic document and indicates a request to reissue the electronic document with respect to the completion data; and
   sending the reissue request electronic document to a reissuer server.

2. The method of claim 1, further comprising:
   creating, based on the electronic document, a dataset, wherein the created dataset includes the at least one key field and the at least one value; and
   analyzing the created dataset, wherein the at least one transaction parameter is determined based on the analysis.

3. The method of claim 1, wherein analyzing the electronic document further comprises:

performing optical character recognition on the electronic document.

4. The method of claim 1, wherein the electronic document lacks at least a portion of the required data when at least one portion of the template corresponding to the at least one electronic document requirement is at least one of: missing, incomplete, and unclear.

5. The method of claim 1, wherein the reissue request electronic document is an electronic application form.

6. The method of claim 1, wherein the electronic document is an electronic evidencing document issued by a supplier, wherein the reissuer server is a server of the supplier.

7. A non-transitory computer readable medium having stored thereon instructions for causing a processing circuitry to perform a process for obtaining a reissue of an electronic document lacking required data, the electronic document including at least partially unstructured data, the process comprising:
   identifying, in the electronic document, at least one key field and at least one value, wherein
   identifying the at least one key field and the at least one value further comprises:
      analyzing the electronic document to determine data in the electronic document; and
      extracting, based on a predetermined list of key fields, at least a portion of the determined data, wherein the at least a portion of the determined data matches at least one key field of the predetermined list of key fields;
   creating a template for the electronic document, wherein the template is a structured dataset including at least one transaction parameter determined based on the at least partially unstructured data;
   querying at least one data source for at least one requirement based on the template, wherein the at least one requirement defines required data for the electronic document;
   determining, based on the template and the at least one requirement, whether the electronic document lacks at least a portion of the required data;
   retrieving completion data when it is determined that the electronic document lacks at least a portion of the required data, wherein the completion data completes the required data;
   generating a reissue request electronic document, wherein the reissue request electronic document includes the electronic document and indicates a request to reissue the electronic document with respect to the completion data; and
   sending the reissue request electronic document to a reissuer server.

8. A system for obtaining a reissue of an electronic document lacking required data, the electronic document including at least partially unstructured data, comprising:
   a processing circuitry; and
   a memory, the memory containing instructions that, when executed by the processing circuitry, configure the system to:
   identify, in the electronic document, at least one key field and at least one value, wherein
   identifying the at least one key field and the at least one value further comprises:
      analyze the electronic document to determine data in the electronic document; and
      extract, based on a predetermined list of key fields, at least a portion of the determined data, wherein the at least a portion of the determined data matches at least one key field of the predetermined list of key fields;

create a template for the electronic document, wherein the template is a structured dataset including at least one transaction parameter determined based on the at least partially unstructured data;

query at least one data source for at least one requirement based on the template, wherein the at least one requirement defines required data for the electronic document;

determine, based on the template and the at least one requirement, whether the electronic document lacks at least a portion of the required data;

retrieve completion data when it is determined that the electronic document lacks at least a portion of the required data, wherein the completion data completes the required data;

generate a reissue request electronic document, wherein the reissue request electronic document includes the electronic document and indicates a request to reissue the electronic document with respect to the completion data; and send the reissue request electronic document to a reissuer server.

9. The system of claim 8, wherein the system is further configured to:
   create, based on the electronic document, a dataset, wherein the created dataset includes the at least one key field and the at least one value; and
   analyze the created dataset, wherein the at least one transaction parameter is determined based on the analysis.

10. The system of claim 8, wherein the system is further configured to:
    perform optical character recognition on the electronic document.

11. The system of claim 8, wherein the electronic document lacks at least a portion of the required data when at least one portion of the template corresponding to the at least one electronic document requirement is at least one of: missing, incomplete, and unclear.

12. The system of claim 8, wherein the reissue request electronic document is an electronic application form.

13. The system of claim 8, wherein the electronic document is an electronic evidencing document issued by a supplier, wherein the reissuer server is a server of the supplier.

* * * * *